United States Patent [19]

Kaszman

[11] Patent Number: 4,761,590

[45] Date of Patent: Aug. 2, 1988

[54] ELECTRIC MOTOR

[75] Inventor: John Kaszman, Willowdale, Canada

[73] Assignee: Polestar Magnetronics Inc., Willowdale, Canada

[21] Appl. No.: 77,412

[22] Filed: Jul. 20, 1987

[51] Int. Cl.$^4$ ............... H02P 8/02; H02K 29/00
[52] U.S. Cl. ................... 318/254; 318/138; 318/696; 310/156
[58] Field of Search ............ 318/138, 254, 701, 135; 310/12, 13, 156, 185

[56] References Cited

U.S. PATENT DOCUMENTS

| | | | |
|---|---|---|---|
| 3,534,204 | 10/1970 | Groezinger. | |
| 3,983,430 | 9/1976 | Howard | 310/168 |
| 4,025,831 | 5/1977 | Webb | 318/254 |
| 4,095,150 | 6/1978 | Senckel | 310/12 |
| 4,318,038 | 3/1982 | Muhehirt | 318/135 |
| 4,460,855 | 7/1984 | Kelly | 318/135 |
| 4,584,506 | 4/1986 | Kaszman | 318/254 |

OTHER PUBLICATIONS

'Switched Reluctance Motor Drive Systems' Design Engineering, May 1984, pp. 74–75.

Primary Examiner—David Smith, Jr.

[57] ABSTRACT

An electric motor operating on the reluctance principle employs spaced rotor discs presenting rings of inwardly fcing poles of alternating polarity, typically by means of permanent magnets, and an annular stator between the discs consisting of a ring of H shaped cores, with the stems of the H's extending peripherally. Two sets of windings on these cores are energized alternately so as to provide alternating polarization of pole pieces presented by the cores to the rotor discs, with a timing such as to produce continuous rotation at a controlled rate, of the discs as their magnets seek a minimum reluctance position.

8 Claims, 3 Drawing Sheets

ELECTRIC MOTOR

FIELD OF THE INVENTION

This invention relates to electric motors operating on the reluctance principle, this term being used in a broad sense to refer to motors in which a changing electromagnetic field is generated by a stator, and poles of a normally unwound ferromagnetic rotor move in that field towards a minimum reluctance positions whose angular location is progressively altered by the changing electromagnetic field so as to produce continuous rotation of the rotor. In principle, the functions of the rotor and stator can be interchanged, but in practice it is usually more satisfactory for the electromagnetic field to be produced by the stator since this eliminates the necessity for slip rings or commutators, and this arrangement will be assumed in the following specification and claims. The polarization of the rotor may be induced in soft magnetic material by the stator electromagnetic field, as is usually the case in reluctance motors as commonly so called, or the rotor poles may be permanently polarized by permanent magnets comprised by the rotor, as in most stepper motors and many forms of brushless direct current motor.

BACKGROUND OF THE INVENTION

Most electric motors have traditionally been provided with both stator and rotor windings, even though in many induction motors the latter may be simplified to a "squirrel cage", and rely upon either conduction through commutators or slip rings, or upon induction, to energize the rotor. Induction motors normally require an alternating supply for their operation, and are not in general well adapted to variable speed operation since their optimum operating speed is ultimately related to the velocity of the rotating field generated by the alternating supply. Direct current motors on the other hand require some form of commutative switching of the supply to the rotor to provide continuous rotation, and such commutators are expensive to build and maintain, as well as a source of undesirable broadband electrical interference. Control of such motors where accurate speeds or displacement control is required remains complex and difficult.

As a result, attention has been given, for a wide range of potential applications ranging from motors for consumer electronic equipment to large appliance, traction and industrial motors, to motors of the reluctance type in which the current through stator windings is switched, usually in modern designs by sold state devices, so as to produce a changing electromagnetic field which will result in progressive angular movement of poles of a stator as it seeks a minimum reluctance position within the field. This movement may be in the form of discrete steps, individually controlled, as in a stepper motor, or the movement of the rotor may be sensed by some suitable means to switch the current through the stator windings so as to provide a free running mode in which successive steps or impulses run together to provide continuous rotation. In an article entitled "Switched Reluctance Motor Drive Systems", published in Design Engineering, May 1984, pages 74–75, such a reluctance motor is described, and the advantages of such motors in variable speed drives are discussed.

Regardless of the mode of operation, the inductance of the windings provides difficulties as they are progressively switched, since it limits the rate of increase of the current upon energization and the rate at which magnetic energy can be dispersed when no longer required, particularly if excessive potentials are not to be induced in the windings.

Various prior art approaches to this problem are discussed in my U.S. Pat. No. 4,584,506, incorporated herein by reference, which discloses an electric motor having a stator with multiple sequentially energizable phase windings and a rotor magnetized to seek a minimum reluctance position within a progressively moving electromagnetic field produced by said phase windings, first controlled switching means in series relative to a D.C. power supply with each phase winding, and means to control said first switching means to produce said progressively moving electromagnetic field, wherein (a) a charge storage capacitor is provided for each such phase winding, with one terminal of said capacitor connected by a low impedance path to said supply, and the other terminal having first and second connections establishing alternative low impedance paths to opposite ends of the winding, the first such connection being established by first diode means to that end of the winding connection to the first switching means, the first diode means being oriented to permit low impedance passage to said capacitor of forward current continuing in said winding after turnoff of the switching means, and the second such connection being established by second controlled switching means, (b) means are provided to run on said second switching means substantially simultaneously with said first switching means to provide low impedance passage of current from said capacitor to said end of the winding remote from the first switching means, and (c) second diode means are provided between the supply and said remote end of the winding such as to present a low impedance path for forward current from the supply, but a high impedance to reverse current.

U. S. Pat. No. 3,534,204, issued Oct. 13, 1970 to Groezinger, discloses an alternator in which two rotor discs having respectively multiple north and south hompoles flank a multipolar annular stator having plural pairs of poles directed towards the poles of the rotor discs with a winding portion around the stator between each pair of poles. The north and south homopoles are staggered so that any particular portion of the stator winding is subjected to alternating magnetic fields as the homopoles of the rotor discs pass that portion. By arranging the rotor homopoles so as to have a width which is a multiple of that of the stator poles, and organizing the winding appropriately, a multiple phase output may be obtained.

SUMMARY OF THE INVENTION

I have found that by adopting a physical structure having some superficial similarities to that disclosed in the Groezinger patent discussed above, in a motor of the general type to which my U.S. Pat. No. 4,584,506 is directed, I can produce a compact and efficient motor structure capable of producing a variable speed motor having a high power to weight ratio. The structural similarity to Groezinger is however purely superficial, since my motor should employ rotor discs having alternating north and south poles (which rules out use of electromagnetic energization of these poles in the manner shown by Groezinger), and the polarization of the stator poles is also alternating, and controlled by the energization of the windings, whereas the polarization of Groezinger's stator poles is induced by the rotor poles, and the pattern of polarization is produced by staggering of the homopoles in the two rotors.

An electric motor according to the invention comprises two coaxial rotor discs, spaced apart on a rotational axis of the motor and each exhibiting an annular array of alternating north and south magnetically polarized pole pieces, at a predetermined annular pitch with the like polarized pole pieces in each rotor angularly aligned; a stator coaxial with and between said rotors, said stator exhibiting two angularly aligned axially spaced annular arrays of pole pieces at a predetermined pitch equal to the pitch of the rotor pole pieces, arranged so that the annular arrays of pole pieces of the rotor discs can be aligned in close juxtaposition with the pole pieces of the annular arrays of the stator, the stator comprising core members defining said pole pieces such that angularly adjacent pairs of pole pieces in said pole piece arrays of the stator are joined by said core members in an annularly arranged series of H configurations with cross bars in the H configurations extending peripherally of the stator and stems of the H configurations extending parallel to the axis of the motor; electrically energizable windings on said cross bars of the H configurations such that energization of said windings polarizes pairs of pole pieces on stems at opposite ends of the cross bars of said H configurations, with the pole pieces on any one stem having like polarization and the pole pieces on neighbouring stems having opposite polarization; electrical energy storage means external of said windings; and control means, connected between said windings, said electrical energy storage means and connections to a direct current power supply, to control the direction and duration of energization of the windings with reference to the relative angular position of the rotor and stator pole pieces such as to control angular movement of the rotor.

Further features of the invention will become apparent from the following description with reference to the accompanying drawings.

SHORT DESCRIPTION OF THE DRAWINGS

DESCRIPTION OF THE PREFERRED EMBODIMENTS

Figure 1:
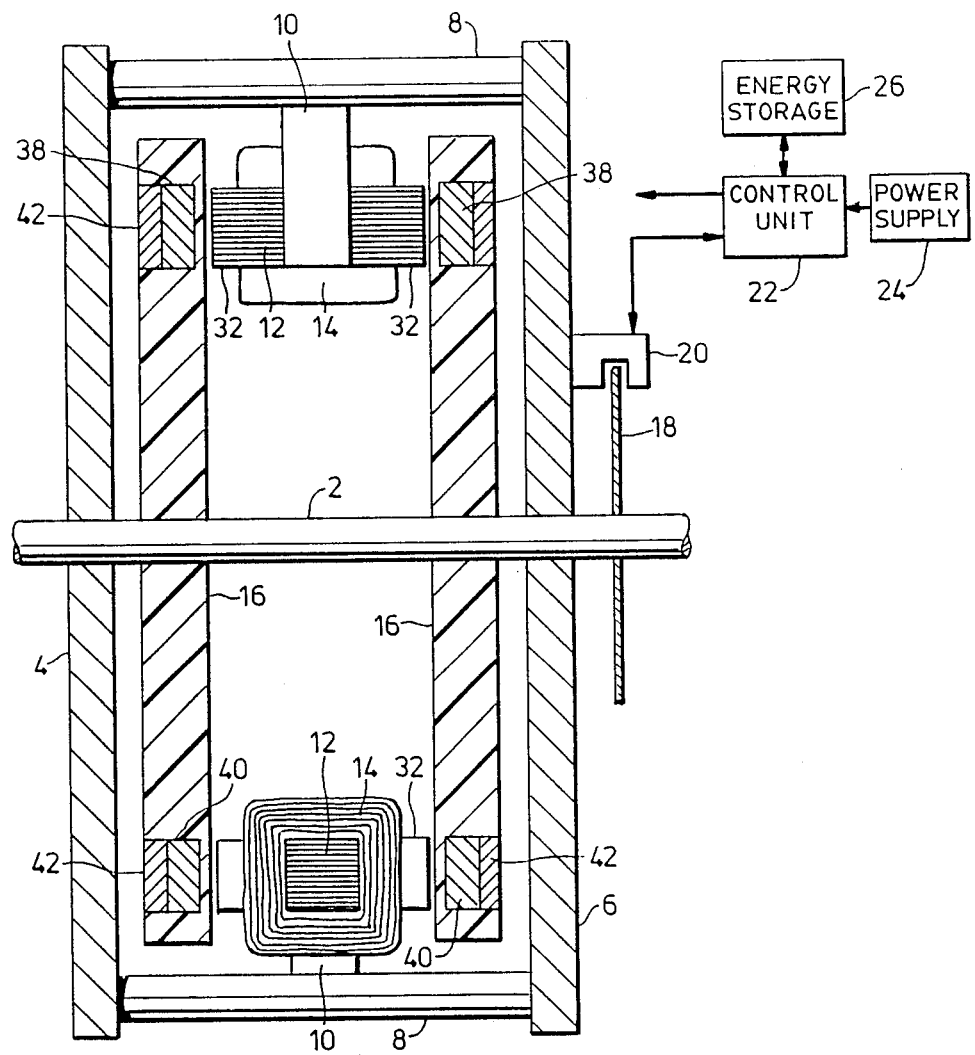
FIG. 1 is an axial cross ection through a first embodiment of motor incorporating the invention.

Referring to FIG. 1, a motor is shown having a shaft 2 journalled in end plates 4, 6 of frames secured together by the bars 8 which also carry brackets 10 supporting cores 12 of stator coils 14 located between rotor discs 16 secured to the shaft 2. A tachometer is provided, typically consisting of a slotted disc 18 secured to the shaft 2 and an optical sensor 20, comprising light emitting and light sensitive diodes on opposite sides of the disc 18, is mounted on the end plate 6, the sensor 20 being connected to a control unit 22 to transmit thereto data as to the angular position of the shaft. The control unit controls the supply of energy from a direct current power supply 24 to the coils 14, and the transfer of energy between the coils and energy storage devices 26, typically capacitors, generally in the manner described in my U.S. Pat. No. 4,584,506. In practice it is preferred for the stator coils to comprise bifilar windings 14a, 14b which are energized alternately in opposite senses so as toprovide alternating polarities at poles of the cores 12 and thus double the number of impulses applied to the rotor discs during a single revolution, as discussed further below.

Further details of the construction of the cores 12, coils 14 and rotor discs 16 will be described with additional reference to FIG. 2. The cores 12 are of H configuration, with the cross bars 28 of the H's extending peripherally and the uprights 30 parallel to the axis of the motor towards the rotor discs. The coils 14a, 14b are bifilar wound on the cross bars 28, so that the uprights provide pole pieces adjacent the rotors. Each upright 30 provides two pole pieces 32 having the same polarity and a polarity opposite to that of the pole pieces 334 provided by the other upright 30. The cores 12 are formed from a stack of soft magnetic H-shaped laminations 36.

Figure 4:
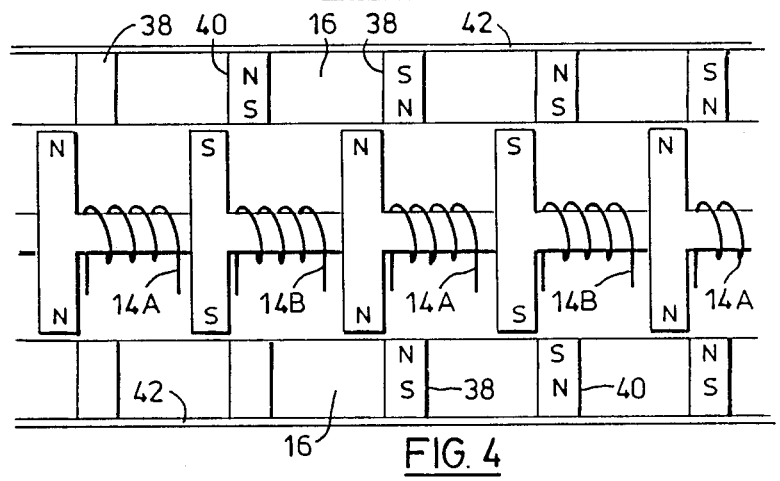
FIG. 4 illustrates an alternative stator configuration.

In an alternative core construction shown in FIG. 4, the cores 12 are connected into a ring by further cross bars 28, and the coils 14a and 14b are wound on alternate cross bars 28. In this case, the cores may be assembled from T-shaped laminations, and the arrangement may assist in maximizing the usage of available space by the cores and windings.

Figure 2:
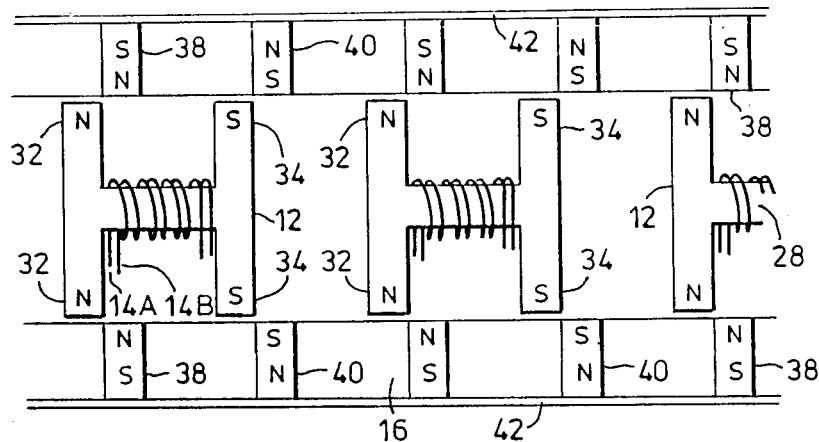
FIG. 2 is a diagrammatic developed fragmentary view of part of the periphery of the motor of FIG. 1.

Referring to the arrangement of FIG. 2, a coil 14a or 14b when energized will magnetize its associated core so as to provide north poles at one of the pairs of pole pieces 32, 34 and south poles at the other pair. The FIG. 3 embodiment will provide a similar effect in relation to the pole pieces adjacent an energized winding 14a or 14b.

The rotor discs 16 are formed largely of non-magnetic material such as laminated fabric reinforced synthetic plastic of suitable strength. Metals such as aluminum may also be used, but care must then be taken to minimize losses due to eddy currents. High tenacity permanent magnets 38, 40 are located in pockets arranged in a ring near the periphery of each rotor, with their magnetic axis extending parallel to the axis of the motor, the magnets 38 having their north poles facing inwards and the magnets 40 having their south poles facing inwards. In order to improve formation of magnetic circuits involving the magnets 38, 40 and the cores 12, soft iron bridge pieces arranged as segments or a continuous ring 42 may be provided within the rotor outward of the magnets. The magnets 38, 40 in the two rotor discs are arranged so that like poles face one another.

The motor described so far has but a single ring of cores 12 and windings 14, but in practice it will often be advantageous to use a plurality of rings of cores and windings, each separated by a rotor disc 16, as shown in FIG. 4. With such an arrangement, the number of rotor discs will exceed by one the number of rings of cores and windings. Whilst the intermediate rotor discs could be formed by two discs as already described mounted back to back, it may also be advantageous to make use of the opposite poles of the magnets 38, 40, the bridge pieces 42 being omitted. This requires either an offset equal to the pitch of the pole pieces 32, 34 between the cores 12 in each ring, or a reversal in the functions of the windings 14a, 14b. Whichever technique is adopted, the construction lends itself to a modular structure by which a compact motor of any desired power output may be produced. If back to back discs are used, timing of the energization of the coils in different sections of the motor may be varied to increase the smoothness of operation.

Figure 5:
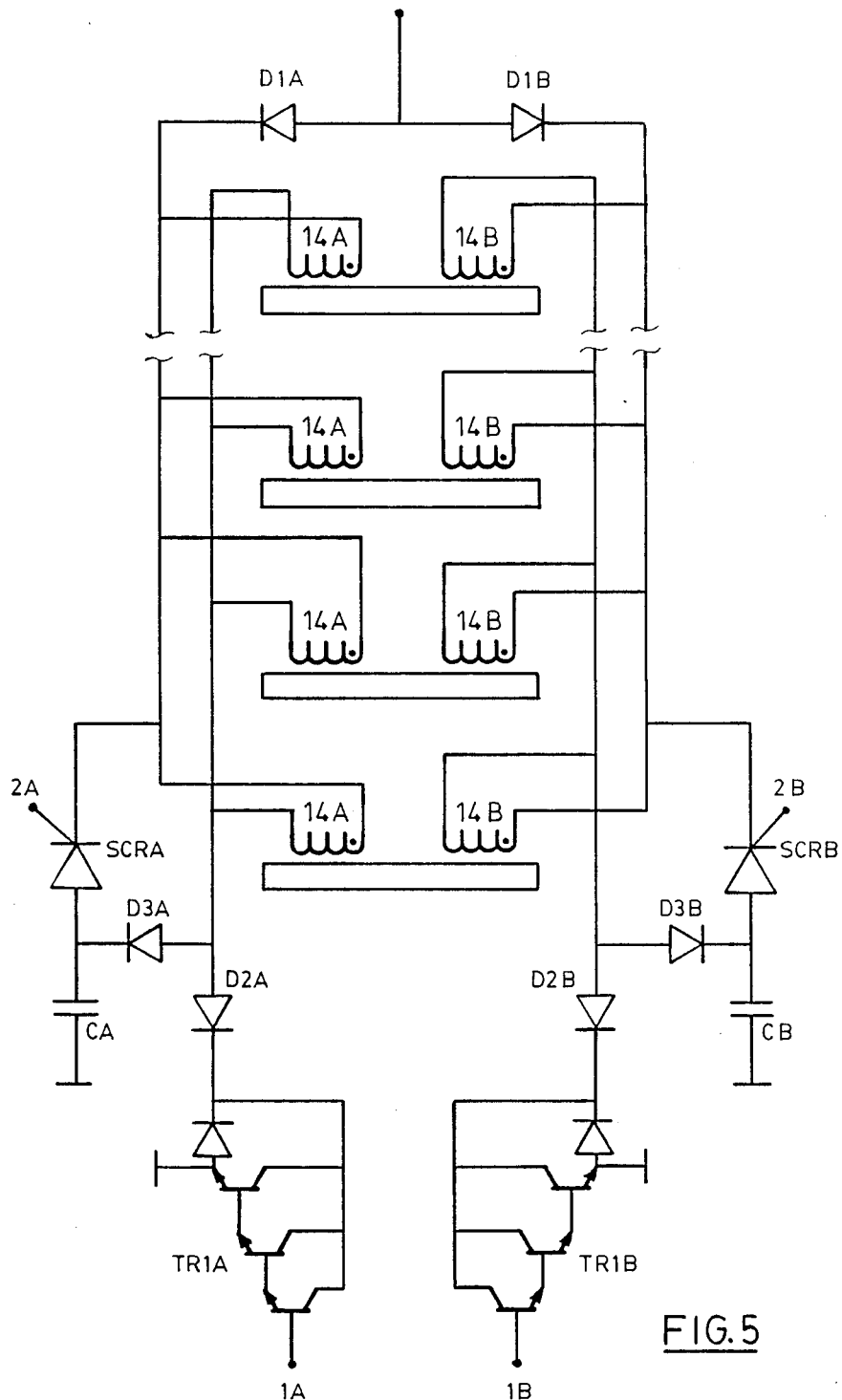
FIG. 5 is a simplified electrical schematic diagram of the motor.

A simplified schematic diagram of the coils 14 and 14b, capacitors CA and CB forming the energy storage devices 26, and parts of the control unit 22, is shown in FIG. 5.

In FIG. 5, it will be noted that the windings 14a, hereinafter referred to as the phase A windings, are all connected in parallel, and the windings 14b, hereinafter referred to as the phase B windings, are all connected in parallel, two identical control circuits being provided, one for each phase. Although parallel connection of the windings is shown, serial connection or a combination of serial and parallel connection could be used. Considering both control circuits, it is assumed that a direct current supply to the motor from the power supply 24 is connected between the terminal marked +, and ground. In the phase A control circuit, and assuming a positive to negative current flow convention, a circuit extends between the supply terminals via a diode D1A, the windings of phase A, a diode D2A, and a triple Darlington transistor combination TR1A. Current can only flow in this circuit when the transistor combinationis switched on by a signal A1 applied to the base of the input transistor, and then only provided that diode D1A is forward biased, i.e. the potential at the marked ends of the phase A windings is less than that of the supply potential, provided that the potential at the marked ends of the windings is greater than that at the unmarked ends, and provided that diode D2A is forward biased, i.e. the potential at the unmarked ends of the windings is above ground potential. Assuming that TR1A is turned on and the above conditions are met, then current flows through the phase A windings, building up at a rate determined by the inductance of the windings which itself will incease as the magnetic circuits through the windings approach a minimum reluctance condition. At some point before this condition is reached, the transistor combination TR1A is switched off and the current flowing in the coils finds an alternative return path through a further diode D3A and a capacitor CA, the capacitor CA forming with the coils a resonant circuit having a period dependent upon the value of CA and the inductance of the parallel connected windings. In an initial period, the magnetic energy is converted and transferred as electrical energy to the capacitor, the charging current through which passes to ground and thence via the supply and the diode D1A to complete the circuit. Once the oscillatory cycle reaches a point at which energy ceases to be transferred to the capacitor, the charge on the latter is retained by the diode D3A which prevents reverse current flow and cuts off the oscillation. During this stage, the potential at the unmarked ends of the windings, and hence on the capacitor, rises substantially above the supply potential.

A thyristor SCRA is connected between the hot plate of the capacitor CA and the marked ends of the windings, and is triggered on by a suitable signal 2A applied simultaneously with application of a turn-on signal 1A to the transistor combination TR1A, thus completing a current path from the hot plate of the capacitor, through the windings, the diode D2A and the transistor TR1A to ground and thus the grounded plate of the capacitor. Since the hot plate of capacitor CA will initially have a substantially higher potential than the supply, diode D1A will be reverse biased and current will not pass from the supply until and unless the potential at the junction of thyristor SCRA and diode D1A drops below the supply potential at which point current will flow from the supply through the diode rather than from the capacitor through the thyristor and the latter will turn itself off.

The control circuit associated with the windings of phase B operates similarly, similar reference indicia being used with a B suffix rather than an A suffix. The control signals 1A, 2A, 1B, 2B may be generated in control unit 22 in any way suited to the application of the motor. Typically, the sensor 20 provides signals which are amplified, shaped and phase shifted to form control signals, the signals also being compared with a reference signal representing a desired speed of the motor, with the control signals being modified accordingly. Under over-run conditions, energy may be withdrawn from the capacitors CA and CB and recycled to the supply or otherwise utilized so as to provide a more rapid reduction in speed of the motor.

When the motor shown in FIGS. 1 and 2 is deenergized, the magnets 38, 40 will endeavour to move the rotor discs 16 to a position in which the length of the magnetic circuits between the magnetic poles in discs 16 through the cores 12 is minimized. Let us assume however for the purposes of description that the relative positions of the magnets and the cores are as shown in FIG. 1 with the rotor discs somewhat displaced to the right of this minimum reluctance position. Now assume that windings 14A are energized by the control circuit 22 so that the pole pieces 32 of the cores 12 assume north magnetic polarity and the pole pieces 34 assume south magnetic polarity. Since the pole pieces 32 and the inward poles of the magnets 38 on the one hand, and the pole pieces 34 and the inward poles of the magnets 40 on the other hand now have the same polarity, the magnetic circuits are now in a near maximum reluctance condition. The rotors 16 will therefore move to the right (as seen in FIG. 1) towards a minimum reluctance position with the magnets 38 opposite the pole pieces 34, and the magnets 40 opposite the pole pieces 32.

Figure 3:
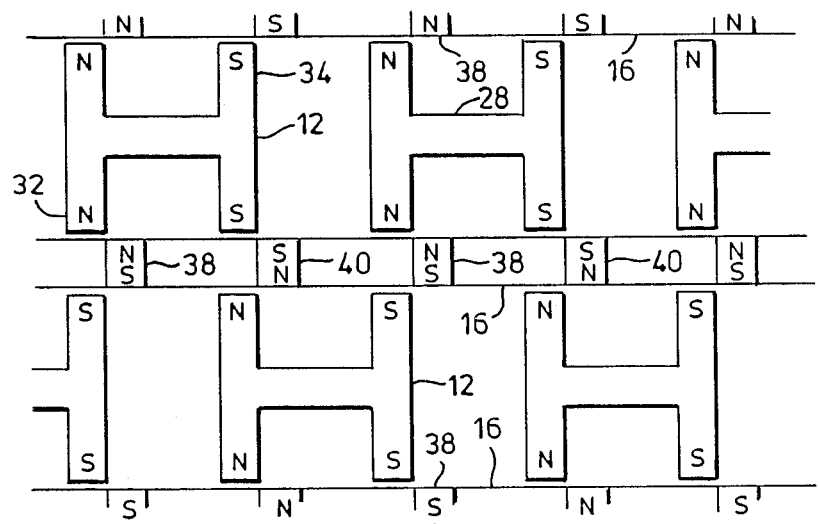
FIG. 3 is a similar view of a second embodiment of motor incorporating the invention.

Before this position is reached, the windings 14a are de-energized, and the magnetic field in the cores 12 is collapsed as previously described. As the magnets pass the next pole pieces, the windings 14b are energized so as to reverse the polarization of the pole pieces and again urge the rotors to the right. The length and timing of the energization of the windings will depend on the power input needed to accelerate or maintain the speed of the motor, so as to provide most effective use of the magnetic impulses applied to the rotor by each energization of the windings. Operation of the embodiments of FIGS. 3 and 4 is similar.

Proper starting of the motor can be assured in various ways, depending on the application. If the motor is exactly in a minimum reluctance position on starting, there may be an uncertainty as to the initial direction of motion. This may be prevented by means ensuring an initial mechanical or electrical assymmetry, for example by preventing the motor from coming to rest in a minimum reluctance position through the use of a ratchet and pawl device, or by providing some means to provide a starting impulse in the proper direction.

Although the use of permanent magnets 38 and 40 has been assumed in the foregoing description, suitably wound D.C. energized electromagnets could be utilized, energization being via slip rings on the shaft 2. With the continuing development of materials showing super conductivity at relatively elevated temperatures, the provision of compact direct current maintained electromagnets operating at very high flux densities whilst requiring minimal maintaining current may provide a viable and efficient alternative to the use of permanent magnets.

I claim:

1. An electric motor comprising two coaxial rotor discs, spaced apart on a rotational axis of the motor and each exhibiting an annular array of alternating north and south magnetically polarized pole pieces, at a predetermined annular pitch with the like polarized pole pieces in each rotor angularly aligned; a stator coaxial with and between said rotors, said stator exhibiting two angularly aligned axially spaced annular arrays of pole pieces at a predetermined pitch equal to the pitch of the rotor pole pieces, arranged so that the annular arrays of pole pieces of the rotor discs can be aligned in close juxtaposition with the pole pieces of the annular arrays of the stator, the stator comprising core members defining said pole pieces such that angularly adjacent pairs of pole pieces in said pole piece arrays of the stator are joined by said core members in an annularly arranged series of H configurations with cross bars of the H configurations extending peripherally of the stator and stems of the H configurations extending parallel to the axis of the motor; electrically energizable windings on said cross bars of the H configurations such that energization of said windings polarizes pairs of pole pieces on stems at opposite ends of the cross bars of said H configurations, with the pole pieces on any one stem having like polarization and the pole pieces on neighbouring stems having opposite polarization; electrical energy storage means external of said windings; and control means, connected between said windings, said electrical energy storage means and connections to a direct current power supply, to control the direction and duration of energization of the windings with reference to the relative angular position of the rotor and stator pole pieces such as to control angular movement of the rotor.

2. An electric motor according to claim 1, wherein the windings comprise two sets of phase windings alternatively energizable to provide opposite polarization of the stator pole pieces.

3. An electric motor according to claim 2, wherein the windings of the two sets are bifilar wound on the same cross pieces.

4. An electric motor according to claim 1, wherein the H configurations are joined by further peripheral cross bars to form a continuous annulus.

5. An electric motor according to claim 1, comprising a plurality of stators each flanked by two rotor discs.

6. An electric motor according to claim 5, wherein each adjacent pair of stators is separated by a single rotor disc, with pole pieces on opposite sides of the disc formed by opposite poles of magnets having magnetic axes extending parallel to the rotational axis of the motor.

7. An electric motor according to claim 1, wherein the pole pieces of the rotor are formed by permanent magnets.

8. An electric motor according to claim 2, further comprising first controlled switching means in series relative to a D.C. power supply with each phase winding, and means to control said first switching means to produce said progressively moving electromagnetic field, wherein
   (a) a charge storage capacitor is provided for each such phase winding, with one terminal of said capacitor connected by a low impedance path to said supply, and the other terminal having first and second connections establishing alternative low impedance paths to opposite ends of the winding, the first such connection being established by first diode means to that end of the winding connection to the first switching means, the first diode means being oriented to permit low impedance passage to said capacitor of forward current continuing in said winding after turn-off of the switching means, and the second such connection being established by second controlled switching means,
   (b) means are provided to turn on said second switching means substantially simultaneously with said first switching means to provide low impedance passage of current from said capacitor to said end of the winding remote from the first switching means, and
   (c) second diode means are provided between the supply and said remote end of the winding such as to present a low impedance path for forward current from the supply, but a high impedance to reverse current.

* * * * *